United States Patent [19]

Assaf et al.

[11] Patent Number: 4,672,950
[45] Date of Patent: Jun. 16, 1987

[54] METHOD OF AND APPARATUS FOR PROTECTING A HALOCLINE IN A SALT-WATER SOLAR POND AGAINST THE EFFECTS OF WIND

[75] Inventors: Gad Assaf, Rehovot; Mordechai Regev, Nes Ziona, both of Israel

[73] Assignee: Solmat Systems Ltd., Yavne, Israel

[21] Appl. No.: 367,885

[22] Filed: Apr. 13, 1982

[51] Int. Cl.⁴ .............................................. F25J 3/02
[52] U.S. Cl. .................................... 126/452; 126/415
[58] Field of Search ............... 126/415, 426, 436, 452; 4/498, 499, 503, 505; 60/641.8, 641.9; 159/15

[56] References Cited

U.S. PATENT DOCUMENTS

| | | | |
|---|---|---|---|
| 3,372,691 | 3/1968 | Shachar | 126/271 |
| 4,138,992 | 2/1979 | Shaffer et al. | 126/415 X |
| 4,326,498 | 4/1982 | Eckland | 126/415 |
| 4,336,999 | 6/1982 | Assaf | 126/415 X |
| 4,377,071 | 3/1983 | Assaf et al. | 60/641.8 |

FOREIGN PATENT DOCUMENTS 2819946 12/1978 Fed. Rep. of Germany ..... 60/641.8

OTHER PUBLICATIONS

"The Dead Sea: A Scheme For A Solar Lake", Assaf, G., in Solar Energy, vol. 18, pp. 293-299, Pergamon Press, 1976.

Primary Examiner—Margaret A. Focarino
Attorney, Agent, or Firm—Sandler & Greenblum

[57] ABSTRACT

A halocline in a salt-water solar pond is protected against the effect of wind by dividing the upper portion of the pond into essentially separate cells or units that are segregated, but without hydraulically altering the operation of the pond. Specifically, a floating grid of expandable partitions is placed in the pond, so that an upper surface of each partition protrudes from the water, and the lower surface of each partition extends into the halocline, the liquid in the upper portion of each cell formed by the grid being essentially segregated. Provision is made for periodically expanding the partitions in order to flake off salt that precipitates on the partitions.

25 Claims, 6 Drawing Figures

METHOD OF AND APPARATUS FOR PROTECTING A HALOCLINE IN A SALT-WATER SOLAR POND AGAINST THE EFFECTS OF WIND

TECHNICAL FIELD

This invention relates to a method of and apparatus for protecting a halocline in a salt-water solar pond against the effects of wind.

BACKGROUND OF THE INVENTION

Artificial salt-water solar ponds are presently used as solar collectors in order to provide a source of low-grade heat for conversion into electricity. Such ponds have a three-layer regime: an upper, convective, wind-mixed layer at the surface, with a uniform salinity of 3–5%, and with a depth of 30–50 cm., depending upon wind conditions; and intermediate, non-convective layer, termed a halocline, about 1–1.5 m. deep, with a salinity that increases uniformly with depth from about 5% near the top to about 30% near the bottom; and a lower heat-storage layer, from 3–5 m. deep, depending on the amount of heat storage desired with a uniform salinity of about 30%. Solar radiation incident on the surface is absorbed within the layers. Heat absorbed within a stratum of the wind-mixed layer reduces the density of the stratum, and creates buoyant water than quickly reaches the surface, dissipating the absorbed heat into the atmosphere. Thus, the temperature of the wind-mixed layer approximates ambient temperature. However, heat absorbed in the halocline and in the heat-storage layer is trapped in these layers. The halocline is non-convective, because the density of a stratum is so large, due to its salinity, that any decrease in density due to its temperature rise as a consequence of the absorption of solar radiation is insufficient to materially change its buoyancy, with the result that solar radiation establishes a temperature profile in the solar pond that matches its salinity profile. The halocline thus serves as a transparent, insulating cover for the heatstorage layer, and protects the latter against conductive heat loss to the atmosphere.

From actual experience with solar ponds, the halocline is remarkably stable over long periods of time, because the rate of salt diffusion is so slow. However, the halocline is particularly sensitive to the effects of wind at the surface. Gusts of wind that create surface waves increase mixing at the surface, and increase the depth of the wind-mixed layer at the expense of the halocline. This has the effect of reducing the rate at which heat can be added to the heat-storage layer from solar radiation, because the deeper the wind-mixed layer, the greater is the percentage of heat absorbed within this layer, all of this heat being lost to the atmosphere. In order to reduce this problem, windbreaks are conventionally placed on the surface of the pond; and, to this end, nets of low-density polypropylene, for example, have been floated on the surface. These nets are anchored on the banks or rim of the pond, and have proven to be effective in reducing the effects of wind-mixing. However, a number of problems have developed. First of all, the cross-pieces of the nets must be relatively close to suppress wave formation, with the result that the shadow cast by the nets may represent as much as 5% of the total area of the pond; and the nets thus reduce the efficiency of the pond as a collector. In addition, salt precipitates collect on the exposed surfaces of the nets, increasing their weight, and eventually causing them to sink below the surface, thereby reducing the effectiveness of the nets to suppress waves. Thus, the shadows cast by conventional windbreaks, and the maintenance required as a consequence of precipitates collecting thereon, constitute problems that heretofore have resisted solution.

It is, therefore, an object of the present invention to provide a new and improved method of and apparatus for protecting a halocline in a salt-water solar pond against the effectiveness of wind, wherein the deficiencies of the prior art are overcome or substantially reduced.

SUMMARY OF THE INVENTION

According to the present invention, a halocline in a salt-water solar pond is protected against the effect of wind by dividing the upper portion of the pond into essentially separate cells or units that are segregated, but without hydraulically altering the operation of the pond. Specifically, a floating grid of expandable partitions is placed in the pond, so that an upper surface of each partition protrudes from the water, and the lower surface of each partition extends into the halocline, the liquid in the upper portion of each cell formed by the grid being essentially segregated. Provision is made for periodically expanding the partitions in order to flake off salt that precipitates on the partitions.

The depth of the partitions is such that the upper portion of the pond is divided into separate cells that are essentially isolated, thus forming, from a large pond, a series of isolated smaller ponds. The distance between the partitions is selected such that, for wind speeds less than a predetermined value, tilting of the pycnocline due to wind stress at the surface is insufficient to cause the pycnocline to break to the surface. Without the partitions, the wind speed at which the pycnocline breaks to the surface is many times smaller.

The expandable nature of the partitions is achieved by providing a rigid frame in the form of a grid contained within a tubular sleeve of flexible material, the frame preferably having a specific gravity less than that of the wind-mixed layer. Ballast in the sleeve in the form of brine provides partitions that effectively divide the surface of the pond into separate regions. By selectively inflating the sleeves, the shape thereof can be changed to flake off any salt that precipitates on the tubular sleeves.

The rigid frame and tubular sleeves define segregated cells smaller than the area of the pond for limiting the tilting of the pycnocline due to wind stress. However, the exchange of surface water between cells is provided for by depressions in the upper portion of the frame, whereby fluid exchanges of surface water can occur between cells.

BRIEF DESCRIPTION OF THE DRAWINGS

Embodiments of the invention are described below by way of example, and with reference to the accompanying drawings, wherein.

DETAILED DESCRIPTION

Figure 1:
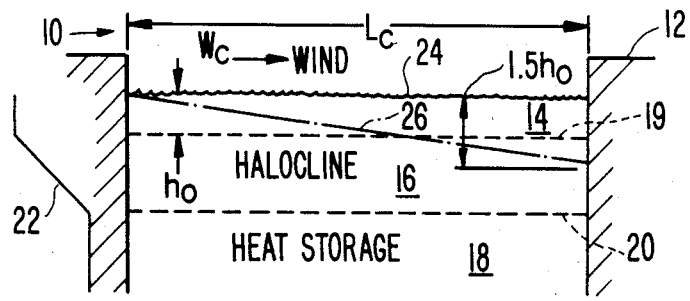
FIG. 1 is a shematic drawing of a section through a salt-water solar pond.

Referring now to FIG. 1, reference numeral 10 designates a conventional salt-water solar pond. The pond is contained within rim or banks 12, and has a three-layer regime, designated by reference numerals 14, 16, and 18. Layer 14, at the surface, is a wind-mixed layer of uniform salinity of 3-5%, and a depth of 30-50 cm., depending on wind conditions. Intermediate layer 16, below wind-mixed layer 14, is termed the halocline. It is a non-convective layer about 1-1.5 m. deep, with a salinity that increases uniformly with depth from about 5% near the top, which is designated by reference numeral 19, to around 30% near the bottom, designated by reference numeral 20. Finally, layer 18 is termed the heat-storage layer, and is from 3-5 m. deep, depending upon the amount of heat storage desired. The salinity of the heat-storage layer is uniform at about 30%. For reference purposes, the salinity profile is shown in FIG. 1 by curve 22.

As is well known, solar radiation incident on surface 24 of the solar pond is absorbed in the various layers of the solar pond. Heat absorbed in wind-mixed layer 14 is quickly dissipated to the atmosphere, because layer 14 is convective, and the heated water quickly rises to the surface, because it is lighter than the surrounding water, and the heat is dissipated to the ambient atmosphere. The temperature of layer 14 thus approximates ambient temperature.

The temperature in the halocline increases with depth, the increasing density of the water in the halocline with depth serving to prevent convection currents therein. Thus, the temperature profile of the solar pond closely matches the salinity profile shown by curve 22. Heat in the heat-storage layer can be removed in a number of conventional ways for useful purposes.

It can be shown that wind stress at the surface of the pond induces pycnocline tilting, as suggested by chain line 26. That is to say, line 19 represents the pycnocline, or the interface between the wind-mixed layer and the halocline, under no-wind conditions. When the wind blows across the surface of the pond, as shown in FIG. 1, the wind stress induced in the water causes the water to "pile up" on the downwind side of the pond, which is the right-hand side, as shown in FIG. 1. While the water level does not change significantly, the change is sufficient to increase the pressure head on the downwind side of the pond, suppressing the pycnocline, while, at the same time, causing the pycnocline to rise at the upwind edge of the pond. The result is a tilting of the pycnocline, as suggested by chain line 26 in FIG. 1.

It can be shown that a critical wind speed exists for a given spacing between the confines of the pond, at which the pycnocline just begins to break to the surface. The maximum spacing $L_c$ for the critical wind speed $W_c$ is as follows:

$$L_c = [(375) N h_o^{1.5}]^2 / (W_c^2) \qquad (1)$$

where $N^2$ is a frequency term having the value $(g/\rho)(d\rho/dz)$ having the units sec.$^{-1}$, $h_o$ is the depth of the wind-mixed layer in the absence of wind, g is the gravitational constant, $\rho$ is the density of the wind-mixed layer at the halocline interface, and $d\rho/dz$ is the rate of change of density with depth in the halocline.

From Eq. (1), the critical length varies inversely with the square of the wind speed. For example, for L=100 m. and N=1.5/sec.$^{-1}$, the critical wind is about 9.2 m./sec; while, for L=100 m., and the same parameters, the critical wind speed is 2.9 m./sec. Thus, for a large-scale solar pond of one square kilometer, the critical wind speed is aroudn 3 m./sec. Thus, a wind speed of about 6 mph across the pond would be sufficient to cause the interface between the wind-mixed layer and the halocline to break to the surface at the upwind edge of the pond. This would be a catastrophic occurrence, in the sense that the heat contained within the halocline would be lost to the atmosphere, and the halocline would be locally distorted; and the ability of the pond to act as a solar collector would be seriously impaired.

From previous experience, floating nets have been used to reduce wind stress. As explained previously, these floating nets, while suppressing waves and somewhat preventing the tilting of the pycnocline, cast a considerable shadow in the solar pond, and decrease its efficiency as a collector. Furthermore, the constant lapping of the surface water on the nets causes salt to precipitate on the nets, thereby increasing their weight, and causing them to sink below the surface of the water. This has the effect of destroying the effectiveness of the nets as a wave-suppression device.

The present invention contemplates dividing the upper portion of the pond into separate cells by a series of floating partitions of a size selected in accordance with local wind conditions, using E. (1) as a guide. Essentially, each cell acts as a separate solar pond in terms of suppressing tilting of the pycnocline, although the pond as a whole is a hydraulic entity.

Figure 2:
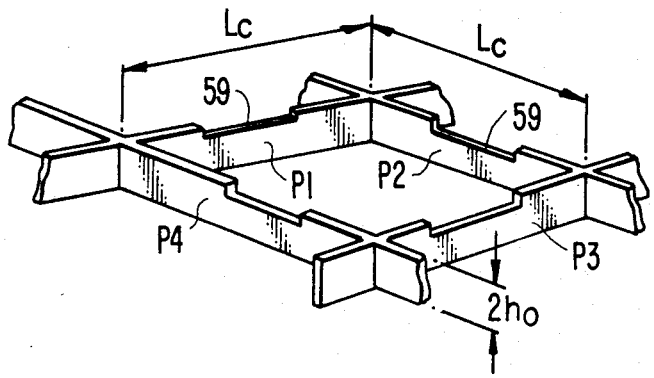
FIG. 2 is a schematic perspective view of apparatus according to the present invention for protecting a halocline in a salt-water solar pond against the effects of wind.

The construction of the cells is indicated in FIG. 2 as compressing connecting floating partitions P1, P2, P3, P4 forming square cells of a dimension L with a depth $2h_o$. Depressions 59 formed along the upper edges of the partitions permit the exchange of surface water between adjacent cells, this being necessary in order to permit each cell to act as a separate solar pond when wind blows across the surface of the pond.

Figure 5:
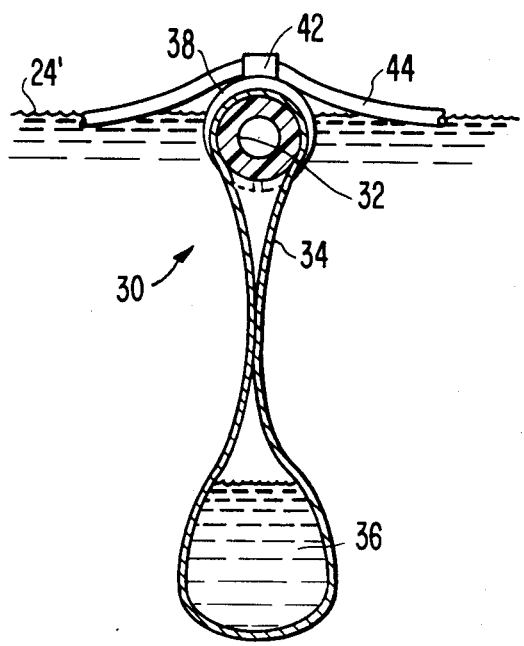
FIG. 5 is a section taken along line 5—5 of FIG. 3, showing the tubular sleeve according to the present invention in its deflated and normal condition.

A practical embodiment of the floating partitions is shown in FIG. 5, to which reference is now made. Each partition 30 includes rigid member 32, having a specific gravity less than water, within tubular sleeve 34 of flexible sheet material. Member 32 may be in the form of a plastic pipe, and the sleeve of flexible sheet material may be polyethylene. The sleeve is totally closed to prevent water outside the sleeve from entering inside the sleeve, which contains ballast 36 in the form of a heavy brine. Clamps 38, which are resilient and which may be formed of slitted sections of pipe, snap over the top of the pipe, thereby retaining the sleeve to the pipe. When partition 30 is immersed in the pond, it floats at the surface, as indicated in FIG. 5, the amount of ballast 36 being adjusted to maintain the top surface of the partition just above the surface 24' of the pond.

The size of sleeve 34 is selected such that the bottom 40 of the partition is at a depth about twice the normal depth of the wind-mixed layer, which, in the example given above, is $h_o$. Under normal conditions, the depth would be about 1 m.

Figure 4:
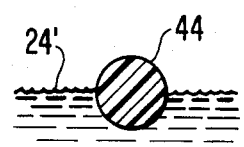
FIG. 4 is a section taken along line 4—4 of FIG. 3 for the purpose of showing how the cables, which restrain the floating frame, float on the surface of the water.

In order to anchor the partitions against wind stress, tie points 42 may be attached to clamps 38 for securing polypropylene cables 44. These cables have a density less than the density of water, and therefore float, as indicated in FIG. 4. The exposed surfaces of these flexible cables suppress wave formation within the cells. Thus, the cables serve not only to anchor the partitions, but also to aid in preventing erosion of the halocline due to wind-mixing.

Figure 6:
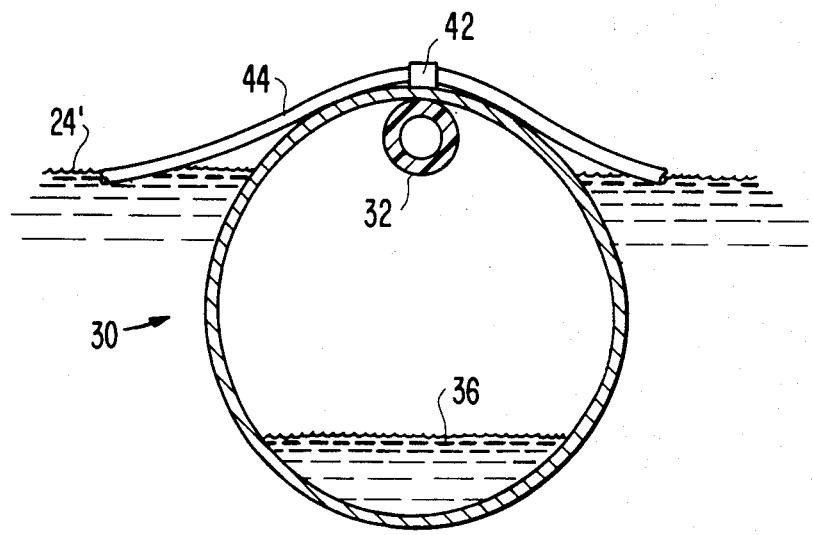
FIG. 6 is a view similar to FIG. 5, but showing inflation of the tubular sleeve shown in FIG. 5 for the purpose of flaking off salt that precipitates on the upper surface of the sleeve.

Due to the constant lapping of surface water over the exposed portion of the partitions, salt will precipitate on the exposed portions, thereby increasing the weight of the partitions, and causing them to sink lower in the water. This would adversely affect the ability of the partitions to function in the manner described above; and the present invention provides for removing precipitates from the surface of the paritions. The means for accomplishing this is the flexible nature of sleeve 34. Specifically, compressed air is pumped into the partitions when the scale on the exposed portions of the partitions reaches a critical value; and the expansion of the surface of the sleeve causes the precipitate to flake off. Expansion of the sleeve is shown in FIG. 6, and is carried out on an asneeded basis. The expansion is easily carried out by providing an air valve (not shown) in the various partitions, and by connecting an air pump to the valve. After the precipitate has flaked off due to the flexing of the sleeve, the air in the sleeve can be removed, and the sleeve will then return to the position shown in FIG. 5.

Figure 3:
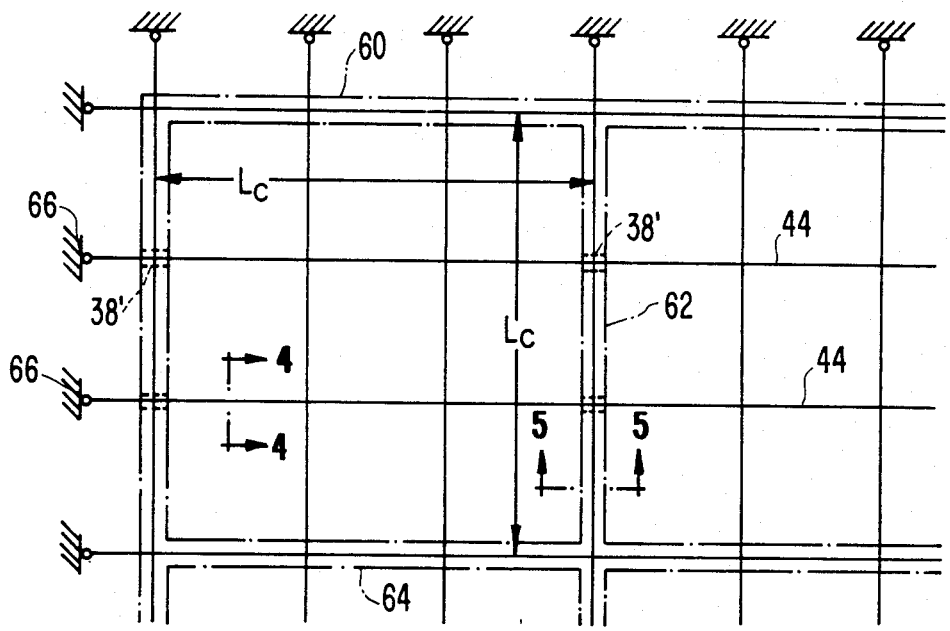
FIG. 3 is a plan view of a large-scale solar pond showing the anchoring of a frame member according to the present invention.

Referring now to FIG. 3, the arrangement for constructing the floating partitions is shown in plan form. That is to say, FIG. 3 shows a plurality of partitions 60, 62, 64, 66 arranged in a square pattern, defining a single cell of dimension $L_c$. Preferably, the cell is formed by building a grid of pipes and slipping tubular sleeves onto the pipes. While the corners need not be sealed fluidically, the sleeves can be attached at the corners to essentially isolate each of the cells, one from the other, at least at the surface of the pond. Suitable clips 38' provide tie points for cables 44, which stretch between, and are securely attached to, opposite rims of the pond, as indicated by reference numeral 66. Each cell in FIG. 3 operates in the manner shown in FIG. 1, thus increasing the critical wind speed at which the pycnocline would break to the surface. The spacing between the paritions should be from 10-50 times the diameter of the pipes. For example, a pipe of 10 cm. in diameter would permit the spacing between the pipes to be about 3 m.; while a pipe of about 30 cm. in diameter would be placed at about 9-10 m. intervals.

Inflation of the tubular sleeves in order to flake off precipitates on the outer surface of the sleeve can be accompanied by removal of some of the ballast from the sleeve in order to control the buoyancy of the inflated partitions. Because the interior of the sleeves are closed, both inflation of the sleeves and the addition or removal of brine can be carried out.

While hollow pipes are shown in FIGS. 5 and 6 as a part of the rigid member, foamed structures could also be utilized.

It is believed that the advantages and improved results furnished by the method and apparatus of the present invention are apparent from the foregoing description of the preferred embodiment of the invention. Various changes and modifications may be made without departing from the spirit and scope of the invention as described in the claims that follow.

What is claimed is:

1. A method for controlling the tilting of the pycnocline, i.e., the interface between the halocline of a saltwater solar pond and the wind-mixed layer thereabove, comprising dividing only the upper portion of the pond into a plurality of cells using paritions of a depth that extend into the halocline whereby the partitions are effective to limit the degree to which the pycnocline tilts within the cells such that the pycnocline is prevented from breaking to the surface.

2. A method for controllng the tilting of the pycnocline, i.e., the interface between the halocline of a saltwater solar pond and the wind-mixed layer thereabove, comprising:
    (a) dividing only the upper portion of the pond into a plurality of cells using partitions of a depth effective to enable the paritions defining a cell to determine the degree to which the pycnocline tilts therewithin;
    (b) floating a grid of expandable partitions in the pond, so that an upper surface of each partition protrudes from the water; and
    (c) periodically expanding the partitions to remove precipitate therefrom.

3. A method according to claim 3 wherein the paritions form cells that are substantially rectangular, of length $L_c$, where $$L_c = [(375)Nh_o^{1.5}]^2/(W_c^2)$$

where $N^2$ is a frequency term having the value $(g/\rho)(d\rho/dz)$ having the units $sec^{-1}$, $h_o$ is the depth of the wind-mixed layer in the absence of wind, g is the gravitational constant, $\rho$ is the density of the wind-mixed layer at the halocline interface, and $d\rho/dz$ is the rate of change of density with depth in the halocline.

4. A method according to claim 3 wherein the depth of each partition is from $H_o$ to $2h_o$.

5. A method according to claim 4 wherein the depth of the partition is about $2h_o$.

6. In a salt-water solar pond having a halocline located beneath a convective upper layer of depth $h_o$ in the absence of wind exposed to the atmosphere, the improvement conprising a plurality of floating partitions that separately enclose the upper portion of different regions of the pond, the upper portion of the partitions projecting above the surface of the water, and the lower portion extending no less than the depth $h_o$.

7. The invention of claim 6, including means for interconnecting adjacent regions so that only surface water is exchanged.

8. Apparatus for use in a salt-water solar pond having a halocline located beneath a convective wind-mixed layer exposed to the atmosphere, said apparatus comprising:
    (a) a floating partition enclosing the upper portion of a region of the pond;
    (b) said partition including an upper surface that projects above the level of the water in the pond, and a lower surface of a depth sufficient to prevent lateral transfer of water in the wind-mixed layer in the region with water in the wind-mixed layer outside the region without interfering with the transfer of water in the heat-storage layer in the region with water in the storage layer outside the region; and (c) means for effecting removal of precipitates from the surface of the partition.

9. Apparatus according to claim 8 wherein the last-mentioned means includes the construction of the partition, which is selectively deformable.

10. Apparatus according to claim 9 wherein the partition is in the form of a flexible tubular sleeve whose interior is isolated from the pond.

11. Apparatus according to claim 10 wherein the tubular sleeve contains ballast.

12. Apparatus according to claim 11 wherein the ballast is brine.

13. Apparatus according to claim 12 including an air space above the brine, and means for selectively pressurizing the air space in order to deform the tubular sleeve.

14. Apparatus according to claim 10 including a rigid member contained in the fleixble tubular sleeve, the member having a specific gravity less than that of water in the wind-mixed layer.

15. Apparatus according to claim 14 wherein the member is in the form of a tube.

16. Apparatus according to claim 15 wherein the tube is anchored to the rim of the pond.

17. Apparatus according to claim 15 wherein the tube is anchored to the rim of the pond by flexible cables having a specific gravity less than that of water in the wind-mixed layer.

18. Apparatus according to claim 17 wherein the cables are polypropylene.

19. Apparatus according to claim 17 wherein the cables float on the surface of the water, and act as wavebreaks.

20. Apparatus for use in a salt-water solar pond having a holocline located beneath a convective, wind-mixed layer exposed to the atmosphere, said apparatus comprising:

(a) a plurality of partitions having a specific gravity less than that of water in the wind-mixed layer for floating in the pond;

(b) each partition including a rigid member within a sleeve of flexible material;

(c) ballast in the sleeve below the rigid member; and (d) means for selectively changing the shape of the sleeves in order to flake off precipitates from the outer surface of the sleeves.

21. Apparatus according to claim 20 including means for anchoring the frame in the pond.

22. The invention of claim 6 wherein the lower portion of the partitions extend into the halocline.

23. Apparatus according to claim 8 wherein said partition extends into the halocline.

24. Apparatus according to claim 8 including means for effecting removal of precipitates from the surface of the partition.

25. A method for increasing the value of the wind speed that causes the pycnocline of a salt-water solar pond to break to the surface comprising dividing only the upper portion of the pond into essentially separate cells using partitions whose depth is at least as deep as the normal depth of the wind-mixed layer covering the halocline in the absence of wind.

* * * * *

UNITED STATES PATENT AND TRADEMARK OFFICE
CERTIFICATE OF CORRECTION

PATENT NO.   : 4,672,950
DATED        : June 16, 1987
INVENTOR(S)  : G. ASSAF et al.

It is certified that error appears in the above-identified patent and that said Letters Patent is hereby corrected as shown below:

Column 4, line 15, change "L=100m" to ---L=1000m---;

Column 4, line 41, change "E." to ---Eq.---;

Column 4, line 47, change "L" to ---$L_c$---.

Column 6, line 30, change "3" to ---2---; and

Column 6, line 43, change "$H_o$" to ---$h_o$---.

Signed and Sealed this

Ninth Day of February, 1988

Attest:

DONALD J. QUIGG

*Attesting Officer*    *Commissioner of Patents and Trademarks*